Figure 1:
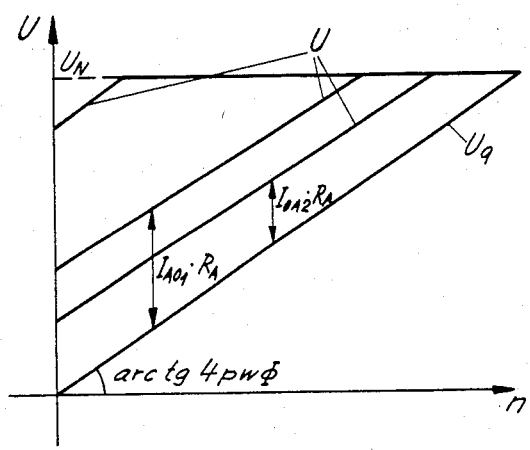

United States Patent [19]

Dätwyler et al.

[11] Patent Number: 4,506,200
[45] Date of Patent: Mar. 19, 1985

[54] METHOD AND APPARATUS FOR OPERATING A D.C. MOTOR

[75] Inventors: Walter Dätwyler, Zurich; Leo Meister, Merishausen, both of Switzerland

[73] Assignee: SIG Swiss Industrial Company, Rhine Falls, Switzerland

[21] Appl. No.: 567,253

[22] Filed: Dec. 30, 1983

Related U.S. Application Data

[63] Continuation of Ser. No. 178,611, Aug. 15, 1980, abandoned.

[30] Foreign Application Priority Data

Aug. 17, 1979 [CH] Switzerland ............... 7540/79

[51] Int. Cl.$^3$ .................................................. H02P 1/00
[52] U.S. Cl. ................................... 318/493; 318/247; 318/338
[58] Field of Search .............. 318/139, 247, 493, 405, 318/338, 317

[56] References Cited

U.S. PATENT DOCUMENTS

| | | | |
|---|---|---|---|
| 3,378,746 | 4/1968 | Weiser | 318/338 X |
| 3,735,220 | 5/1973 | Renner et al. | 318/338 X |
| 3,950,684 | 4/1976 | Peterson | 318/405 X |
| 3,983,466 | 9/1976 | Safiuddin | 318/338 |
| 3,989,990 | 11/1976 | Thompson | 318/493 X |
| 4,019,107 | 4/1977 | Dixon et al. | 318/493 X |
| 4,037,144 | 7/1977 | Ohmae et al. | 318/493 X |
| 4,047,080 | 9/1977 | Peterson | 318/493 X |
| 4,099,111 | 7/1978 | Inaba et al. | 318/493 X |
| 4,196,377 | 4/1980 | Boxer | 318/493 X |
| 4,246,498 | 1/1981 | Asano | 368/87 X |
| 4,247,807 | 1/1981 | Wilson | 318/493 X |
| 4,322,667 | 3/1982 | Ohba | 318/338 |

FOREIGN PATENT DOCUMENTS

| | | |
|---|---|---|
| 1926980 | 4/1980 | Fed. Rep. of Germany . |
| 879928 | 10/1961 | United Kingdom . |
| 1010155 | 11/1965 | United Kingdom . |
| 1307643 | 2/1973 | United Kingdom . |
| 1347743 | 2/1974 | United Kingdom . |
| 1595170 | 8/1981 | United Kingdom . |
| 1596119 | 8/1981 | United Kingdom . |

OTHER PUBLICATIONS

Pp. 233–237 of an article appearing in "Elektrische Bahnen", Heft 10 Jahrgang (year) 1967.
"Erfahrungen mit dem Gleichstromsteller-Fahrzeug bei der Munchner U-Bahn", published in the Mar.-Apr., 1978 issue of Leichtbau der Verkehrsfahrzeuge, pp. 55–58.

*Primary Examiner*—Ulysses Weldon
*Attorney, Agent, or Firm*—Louis Weinstein

[57] ABSTRACT

Method and apparatus for the operation of a direct current (d.c.) motor requiring no start-up resistor and accompanying switches. Regenerative braking is obtained and the torque interference in the operation is carried over to the electrical input after being dampened, due to the "soft" speed/torque characteristic. The d.c. motor is directly controlled by a technique which stimulates either the characteristics of a shunt-wound motor or a series-wound motor. A command signal is provided by an adjustable signal source which is adjusted in accordance with the armature current desired. A d.c. voltage source is controlled to provide an armature current in accordance with the command signal. When the armature voltage reaches its nominal value, a controlled d.c. current source is regulated in accordance with an error signal which is the difference between the command signal and the armature current, to regulate the excitation. The armature current/armature voltage control is thereby switched to an armature current/excitation control under which control the d.c. motor follows the "soft" speed/torque characteristic curve. To achieve braking, the command signal is reversed. This condition is detected by the differential unit to initiate braking. By maintaining the given nominal load current in accordance with the command signal setting of the signal source, motor speed decreases until the excitation reaches its nominal value. This condition is detected, causing the armature current/excitation control to be switched back to the armature current/armature voltage control. With decreasing speed, armature voltage is reduced in value until the d.c. motor stops.

19 Claims, 18 Drawing Figures

METHOD AND APPARATUS FOR OPERATING A D.C. MOTOR

This is a continuation of application Ser. No. 178,611, filed Aug. 15, 1980 now abandoned.

FIELD OF THE INVENTION

The present invention relates to d.c. motors and more particularly to a method and control system for operating a d.c. motor in a smooth and effective manner and especially in a manner utilizing a technique which simulates the characteristics of either shunt/wound or series/wound motors, in accordance with the operating conditions.

BACKGROUND OF THE INVENTION

Direct current motors are normally started from a standstill through the employment of starting resistor banks which are successively switched out of the circuit or alternatively switched into the circuit under control of mechanical switch units. Even disregarding the fact that such switching parts wear out, start-up operation of a d.c. motor is not smooth and continuous, due to the afore-mentioned switching operations.

It is now known from the article "Elektrische Bahnen" 38th Edition (1967), Issue No. 10, that in a compound-wound motor, the armature current is regulated to a desired value and, after obtaining a particular speed, a further increase in velocity is obtained by field reduction. From the compound-wound circuit it becomes clear that the d.c. motor is operated also in the lower speed rate with a series-wound characteristic as the excitation follows the armature current.

On the other hand, it is also known from D.E.-A.S. No. 19 26 980, to operate a shunt-wound motor in the lower speed range so that the armature current is controlled to a given rated value or reference input signal, the excitation thereby being varied together with the armature current actual value so that motor operation follows the operating characteristic of series-wound d.c. motors. If the armature current can no longer follow the rated signal when the motor reaches a particular speed, the excitation will be decreased. Thereby the actual value of the armature current can again be increased to the rated value i.e. the input reference signal.

It is further known that series-wound motors are not suitable for regenerative braking due to the dependancy of armature current and excitation. The efforts to realise such operation with a compound-wound d.c. motor are also relatively difficult due to the dependancy of armature current and excitation here too. Series-wound generators (in the regenerative braking operation the direct current motor operates as a generator) as a practical matter, are not used due to the above-mentioned reason. However although compond-wound generators are used, it is still important to take into consideration the fact that the quadrant change of a motor when operating as a generator (during braking) is also relatively more complicated in compond-wound circuits than is the case with pure shunt-wound circuits.

The present invention solves the following problems by operating a d.c. motor such that the advantageous characteristics of both the series-wound and the shunt-wound motor are both utilized within a unique circuit. Before further explaining the invention some definitions of signals in a general automatic control loop are given.

These definitions are for example taken from IEEE-Transactions, Vol Pas-88, August 1969:
- The input signal to the control system is "the reference input signal" or may be referred to as "the rated value signal".
- This signal is compared with either the "control-led (output) signal" directly if the feedback circuit is just a unity feedback, or with a signal derived from the controlled signal by means of the feedback circuit.
- The "controlled signal" may also be said the "actual value signal" with respect to the "rated value signal".
- The result of the comparison between actual and rated value is the "control deviation".
- This "deviation" acts to adjust the "actuating signal" which latter actuates the controlled or actual signal so that the latter reaches the rated value.

The method of the present invention is thus characterized by the fact that a d.c. motor is operated in such a way that, depending upon the operational conditions it is controlled to follow a shunt-wound characteristic or a series-wound characteristic of torque and revolution.

BRIEF DESCRIPTION OF THE INVENTION

If the conditions under which the motor is operating demand a so-called "soft" torque/speed characteristic curve in order to dampen torque interference, means are provided to control the motor to operate in a manner of a series-wound type. If, on the other hand, regenerative braking is to be realized to the lowest speed, the motor is controlled so as to follow the characteristics of a shunt-wound motor. Thus, in accordance with the invention, the motor is controlled in such a manner as to follow the characteristics of a shunt-wound motor below a given speed and to follow the operating characteristics of a series-wound motor at speeds above said given speed, at least at braking operation with decreasing revolving speeds. Through the use of these two behavioral characteristics in one d.c. motor, it is possible, with relatively minimal efforts, and especially through the use of solid state semi-conductor elements it thus becomes possible to operate a d.c. motor under optimum conditions. Such operation is especially advantageous for employment with driving motors of battery supplied locomotives employed in mines and the like. In the latter example, it is extremely important to be able to eliminate mechanical switches, since the extremely dirty environment in which such devices are operated, drastically affects the life span and operational safety of such mechanical switches.

OBJECTS OF THE INVENTION AND BRIEF DESCRIPTION OF THE FIGURES

It is, therefore, one object of the present invention to provide a novel method and control system for optimizing the operating conditions of a d.c. motor by controlling the motor to follow the operating characteristics of a conventional shunt-wound motor when this characteristic is optimal and to follow alternatively the operating characteristics of a conventional series-wound mtor when this second characteristic is optimal.

Still another object of the present invention is to implement the aforesaid method through the use of solid state electronic components in which significantly increased operating life span and operational safety of the motor and the associated control circuit are attained, especially in dirty environments.

Still another object of the present invention is to apply the above method to two or more of the aforesaid d.c. motors by means of DC/DC pulse converters and to provide a method and apparatus to even out the load pulsations on the power source supplying the motors through an automatically adjustable phase shift technique.

The above, as well as other objects of the present invention, will become apparent when reading the accompanying description and drawing in which it is shown:

FIG. 1 The speed-source voltage and the speed-armature voltage curve with a control of a direct current motor with the armature current as the controlled signal and the armature voltage as the actuating signal for different rated values for the armature current, for the control of a direct current motor with shunt-wound characteristics.

Figure 2:
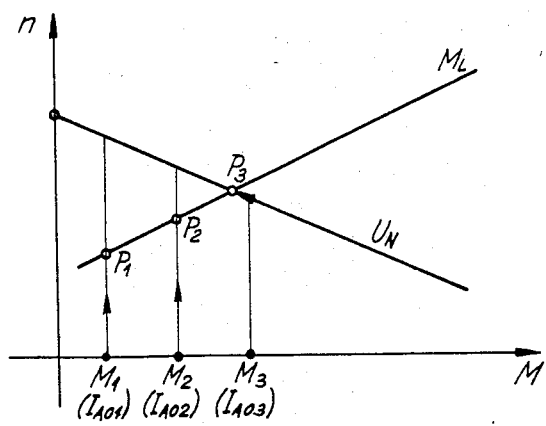

FIG. 2 The resulting torque-speed charasteristic curves.

Figure 3:
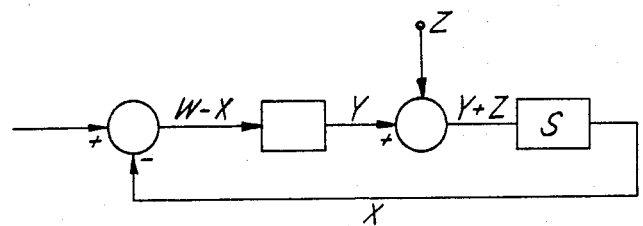

FIG. 3 A principal block diagram of the armature current/armature voltage control.

Figure 4:
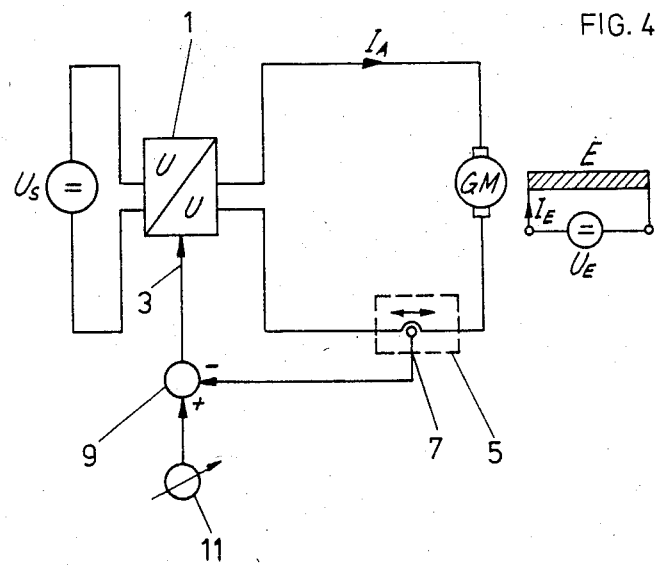

FIG. 4 A functional block diagram of the control according to FIG. 3.

Figure 5:
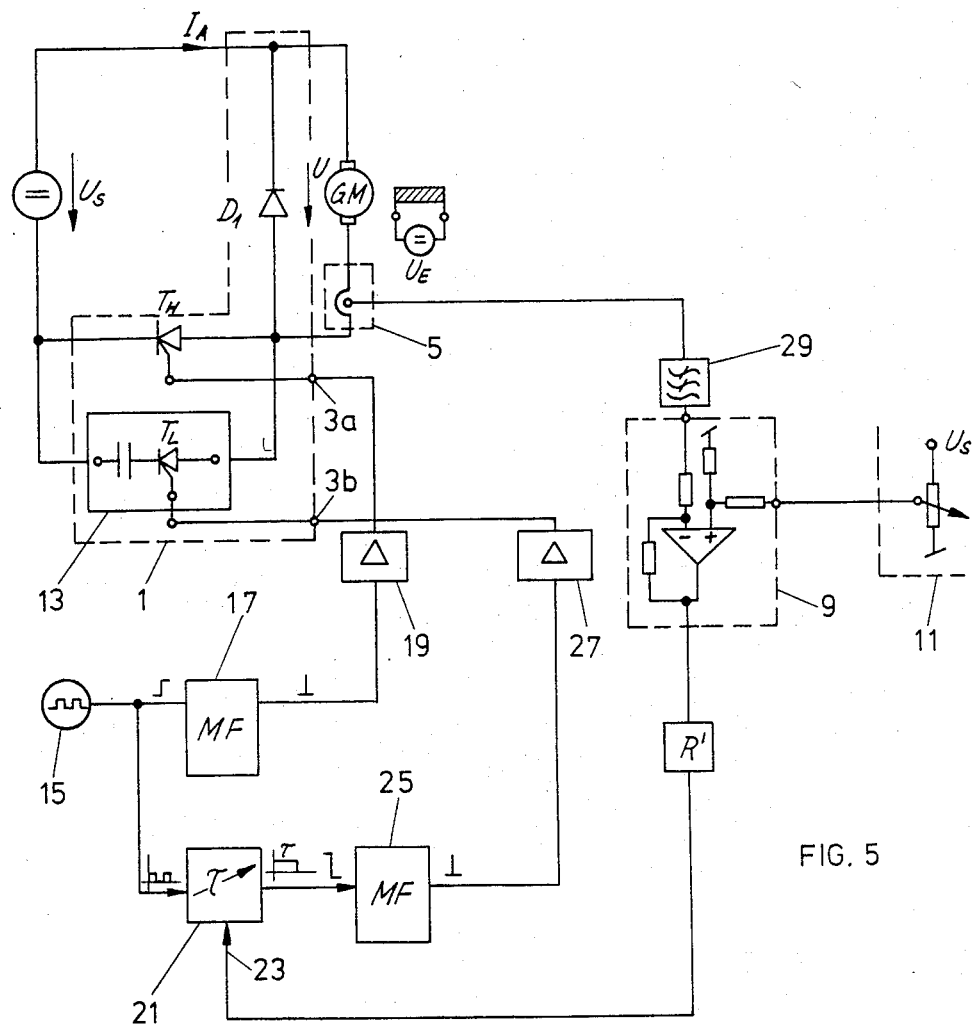

FIG. 5 A circuit diagram, partially with functional blocks of the system according to FIG. 4.

Figure 6:
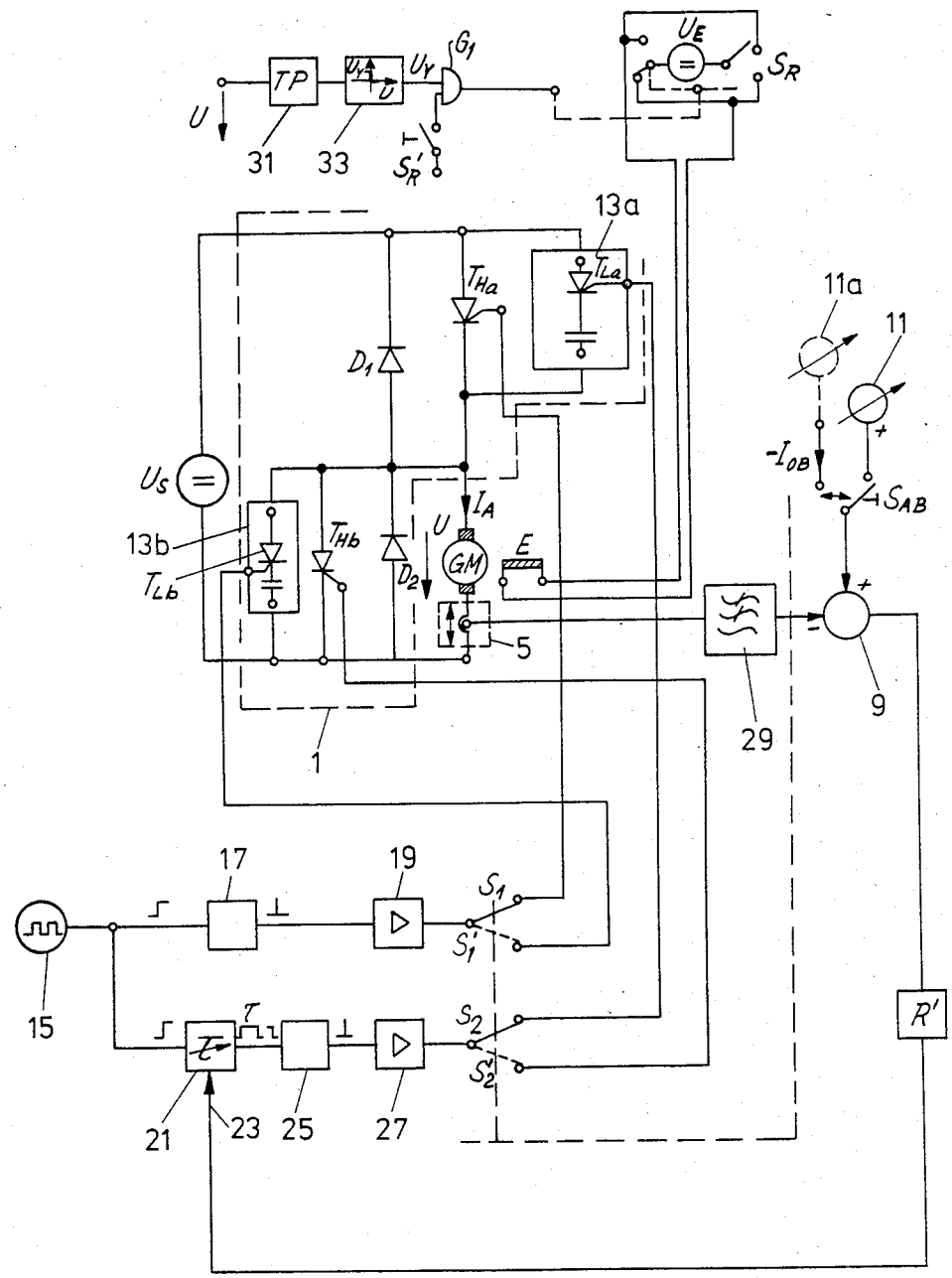

FIG. 6 A circuit diagram, partially with functional blocks of the system according to FIG. 4, with additions for regenerative braking and reversal of the rotational direction.

Figure 7:
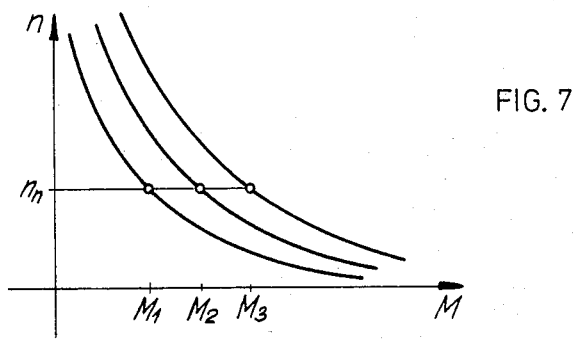

FIG. 7 A speed/torque characteristic of a controlled direct current motor with the armature current as controlled signal and the excitation as actuating signal for the control with series-wound characteristics.

Figure 8:
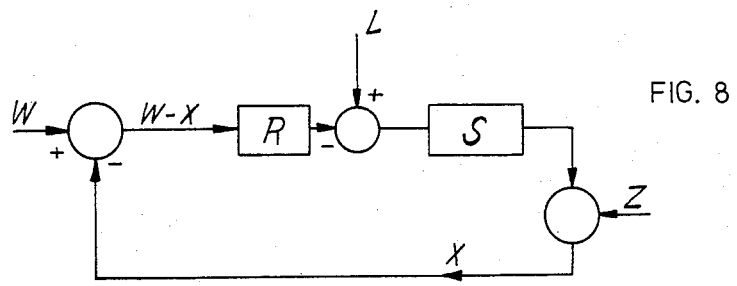

FIG. 8 A basic block diagram of the control circuit for this armature-current/excitation control.

Figure 9:
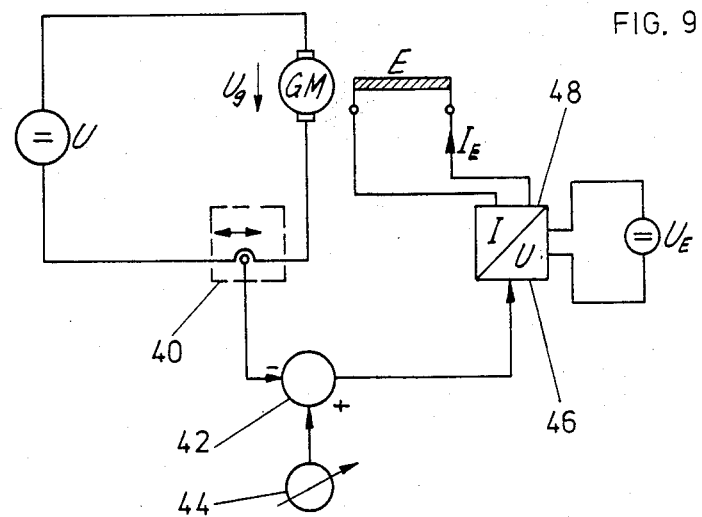

FIG. 9 A functional block diagram for the armature-current/excitation control.

Figure 10A:
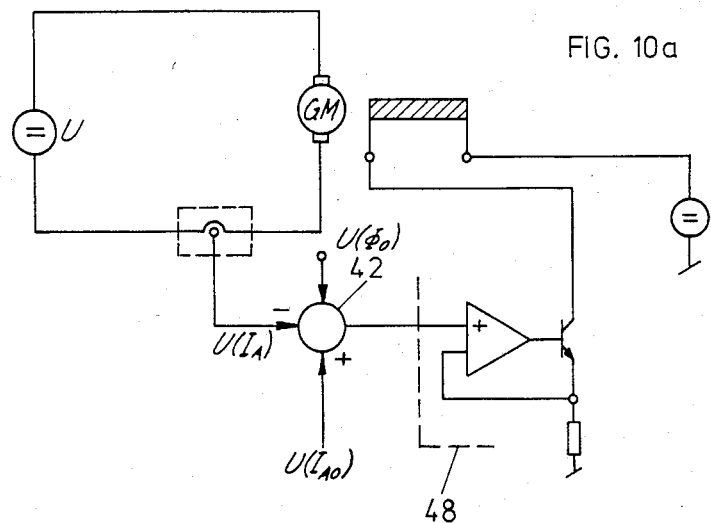

FIG. 10a A functional block diagram according to FIG. 9 with partial information of a possible circuit.

Figure 10B:
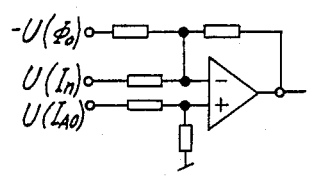

FIG. 10b A circuit realization of a difference unit, shown in FIG. 9 and 10a as functional block, to provide a control deviation for an actuating signal.

Figure 11:
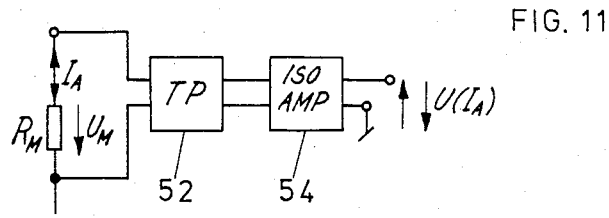
Figure 13:
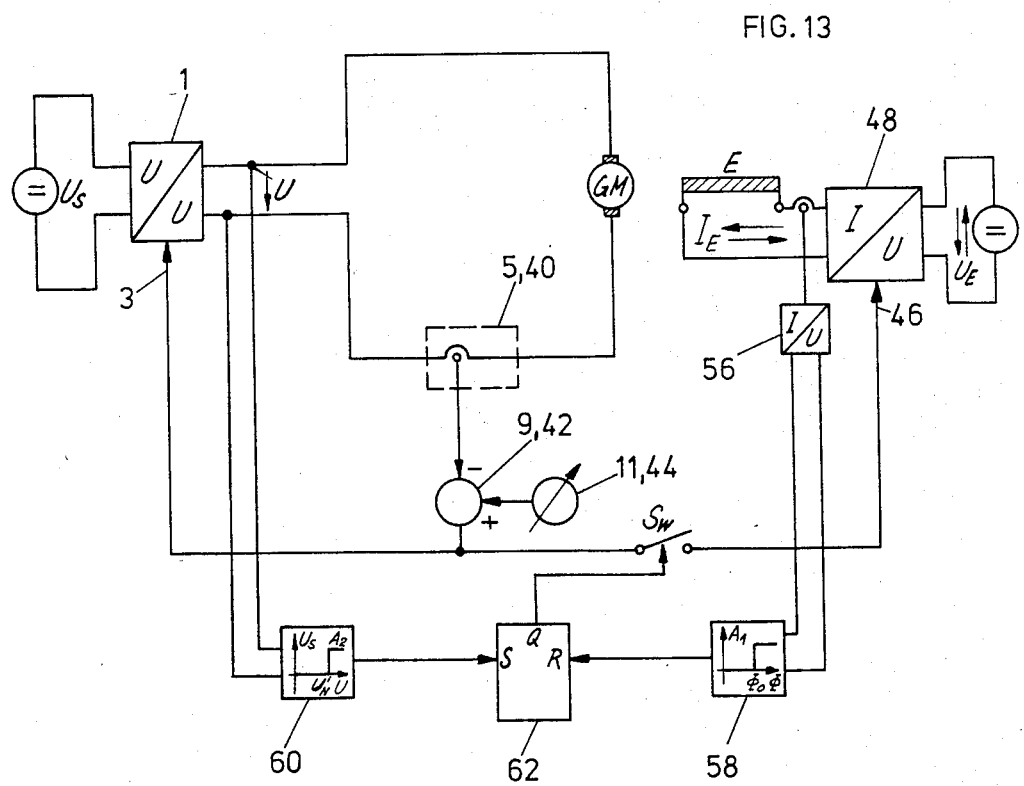
Figure 14:
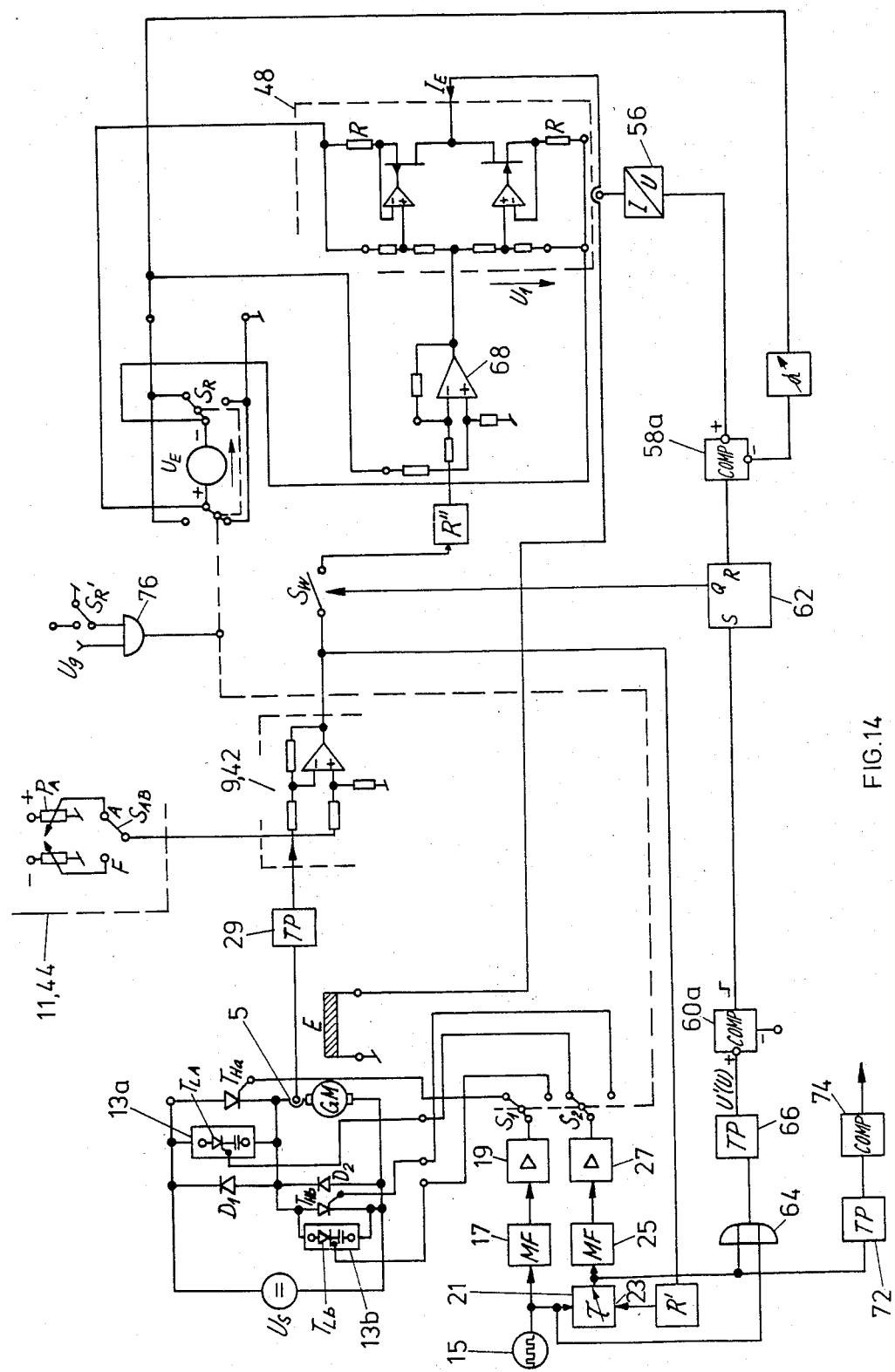

FIG. 11 A realisation of a current measurement unit such as shown as a functional block in the FIGS. 4, 5, 6, 9 and 20a, additionally in the FIGS. 13, 14.

Figure 12:
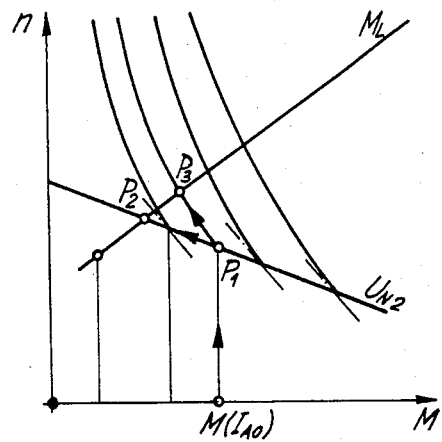

FIG. 12 A speed/torque characteristic of a controlled direct current motor with the armature current as controlled signal and alternatively the armature voltage as actuating signal for shunt-wound characteristics of the excitation as actuating signal for series-wound characteristics.

FIG. 13 A functional block diagram of a system for the execution of the combined control.

FIG. 14 A circuit diagram partially still with functional blocks, according to the functional block diagram of FIG. 13.

Figure 15A:
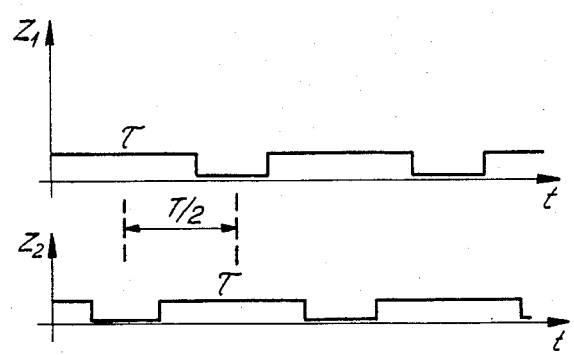
Figure 15A:
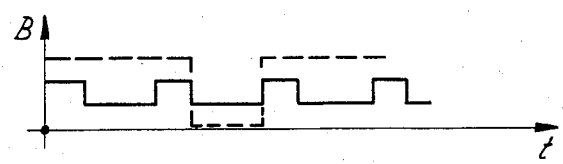

FIG. 15a The timing of two pulsetrains for the control of the direct current pulse transformers or DC/DC pulse converters of two consumer circuits which are supplied from the same supply source, the load pulsation of said source being optimized by an optimized phase shift of the converter pulsetrains, at equal operation of the consumers, as especially suitable for the supply of direct current motors operated as shown in FIGS. 1–14.

Figure 15B:
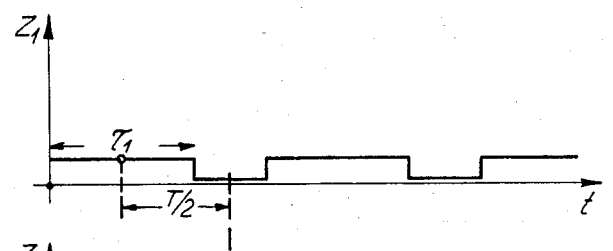
Figure 15B:
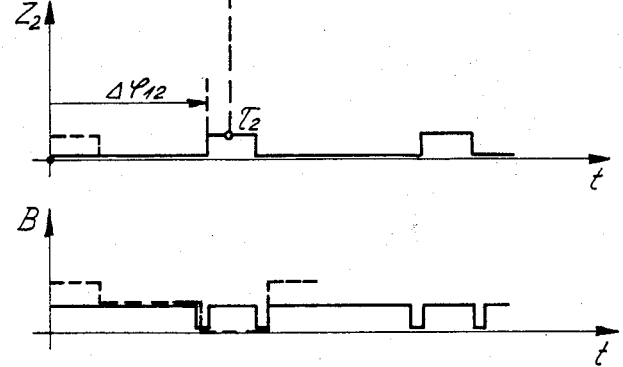

FIG. 15b A diagram according to FIG. 15a with different operations of the consumer circuits, especially of direct current motors.

Figure 16:
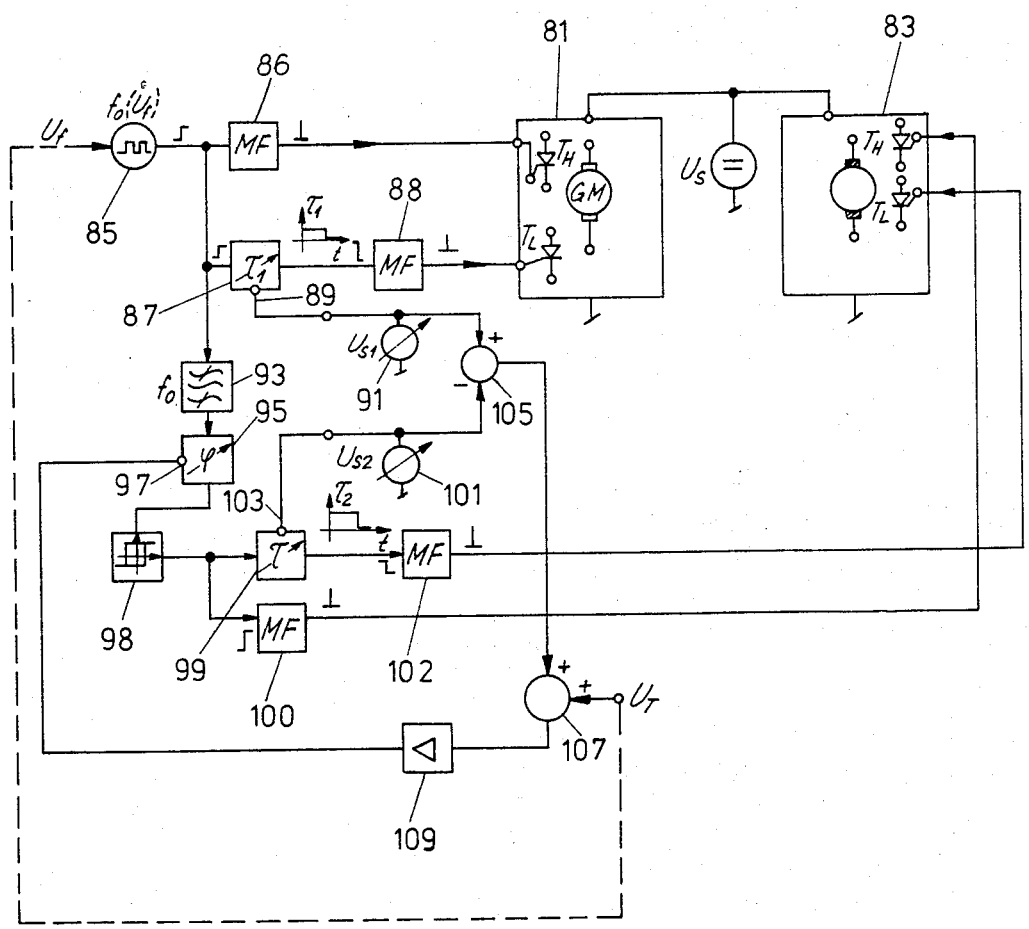

FIG. 16 A functional block diagram for the adjustment of the phase position of the pulsetrains for two DC/DC pulse converters supplied by one source, especially for direct current motors, to optimize load pulsations of said source.

In order to understand more readily the combined shunt-wound/series-wound operation of a direct current motor, which is described with the aid of FIGS. 12 and 13, the shunt-wound behavior in FIGS. 1–6 should be described first, then the series-wound behavior shown in FIGS. 7–11. These descriptions are necessary because the desired behavior of direct current motors is achieved here through specially designed control circuits, whereby one should emphasize that the descriptions for the shunt- and series-wound behavior, and the mentioned possible variations can be transferred to the combined design but it was desirable not to introduce such possible variations in the description of the combined design in order not to complicate the description.

With the control of a direct current machine, with the armature current $I_A$ as controlled signal and an armature current rated signal $I_{Ao}$ the machine will develop a constant torque M according to $$M = 2/\pi \cdot pw\Phi I_A \qquad (0)$$

whereby

P: Number of poles
W: Number of windings between two brushes
$\Phi$: Excitation flow
$I_A$: Armature current It is further valid that:

$$\partial I_A / \partial n = 0 \qquad (1)$$

combined with $$I_A = \frac{U - 4pn\Phi n}{R_A}$$

$$\frac{\partial I_A}{\partial n} = \frac{dU}{R_A \, dn} - \frac{4pn\Phi}{R_A} = 0 \qquad (2)$$

with $R_A$ as the armature resistance and n as the rotational speed, the curve of the armature voltage U as a function of the speed and the command or rated signal $I_{Ao}$, yields:

$$U = 4pw\Phi n + I_{Ao} R_A \qquad (3)$$

as a result.

This curve is shown qualitatively in FIG. 1. Above the speed in the source voltage $U_q$ is plotted which increases linearly with $4pw\Phi$ with an increase in speed. The armature voltage U follows parallel with the source voltage U, whereby the distance of the ordinate corresponds to the voltage drop $I_{Ao}R_A$.

When the armature voltage U reaches the nominal voltage $U_N$ it cannot increase any further as the actuating signal is at its maximum value. The resultant is a speed/torque characteristic curve according to FIG. 2. With an interrupted armature circuit a maximum speed $n_{max}$ appears for which the following is valid:

$$n_{max} = U_N / 4pw\Phi \qquad (4)$$

Corresponding to the given rated signals (or reference input signals) $I_{Aox}$ the machine starts with the corresponding constant torque $$M_x = 2/\pi \cdot p \cdot w \cdot \Phi \cdot I_{Aox} \tag{5}$$

With a characteristic load line $M_L$, which is only drawn in as an example, steady rotation is reached at the given torque $M_1$ at point $P_1$ corresponding to the torque $M_2$ at point $P_2$, while at the given rated signal $I_{Ao3}$ the armature voltage increases to the nominal value $U_N$ to keep the armature current constant. The armature current is then according to equation (2), reduced so that the torque $M_3$ is reduced until the operating point $P_3$ is reached in steady condition. This behavior corresponds to a shunt-wound motor, which contrary to a series-wound motor, is suited very well for regenerative braking.

In FIG. 3 the circuit diagram of the control circuit for the control of the armature current as the controlled signal with the armature voltage as the actuating signal is shown. The control deviation results as follows:

$$W - X = I_{Ao} - I_A \tag{6}$$

The corresponding actuating signal Y results in:

$$Y = A_R(I_{Ao} - I_A) \tag{7}$$

whereby $A_R$ is the amplification of the controller R. With the interference value given by:

$$Z = -4pw\Phi n \tag{8}$$

the controlled signal results in:

$$x = I_A = \frac{A_s A_R}{1 + A_s A_r} I_{Ao} + \frac{AS}{1 + A_s A_R}(-4pw\Phi n) \tag{9}$$

whereby $A_S$ is the amplification of the controlled system S which results in $1/R_A$.

With this control the direct current machine can be put into operation without the provision of mechanically switched start-up resistors. Since there are no switching operations, as is the case with the provision of switchable start-up resistors, the result is a smooth continuous start-up. This control is especially suitable for the operation of battery powered vehicles, especially for mine locomotives.

FIG. 4 shows the basic design of the control for the direct current machine GM. The shunt-wound motor GM, with an excitation winding E, which is supplied from a direct current voltage source $U_E$, or direct current source for $I_E$, is connected with its armature connections to a controllable DC/DC converter 1. The DC voltage source 1 is supplied by a supply source with the voltage $U_S$ and supplies, on its output to the armature circuit, a voltage U. The transfer ratio between the supply voltage $U_S$ and the armature voltage U is controlled by an electrical signal at the control input 3 of the source. The current $I_A$ in the armature circuit of the direct current machine GM is measured by means of a current measuring unit 5, which, preferably and due to the reasons which have to be described more fully herein below on its output 7 supplies a signal proportional to the armature current and with sign according to the current direction. The output signal on the output 7 of the current measuring unit 5 is supplied to a difference unit 9, whose second input is connected to an adjustable signal source 11 which supplies the reference or rated signal. The adjusted signal of the signal source 11 corresponds to the rated value to be reached by the armature current, while the signal which appears at the output 7 of the current measuring unit 5 corresponds to the actual value of the armature current. Corresponding to the control-deviation signal formed in the difference unit 9, the source 1 will be controlled at its control input 3 such that the deviation signal will approach, or reach zero.

It is understood that the supply source for $U_S$ and $U_E$ may be one and the same, for example it could be taken from a battery.

FIG. 5 shows the circuit of FIG. 4 with a thyristor-DC/DC pulse converter as voltage source 1. The supply source for $U_S$ is on the armature tie points of the direct current machine GM, which is bridged by a by-pass diode $D_1$. A main thyristor $T_H$ acting in the armature circuit in a known fashion as a switching unit, opens or interrupts the armature current circuit. To the main thyristor $T_H$ is wired a cut-off circuit 13, of a generally known design and a cut-off thyristor $T_L$. A pulse generator 15 supplies on its output a pulsetrain whereby each pulse, for example, with the rising edge produces a pulse on a monostable multivibrator 17, which is amplified by an amplifier 19 and fires the main thyristor $T_H$. The output of the pulse generator 15 is further connected to a timing device 21 of a known design, for example a timing device MC 15 55 from Motorola, the latter having a control input 23. For example at the rising edges of the pulses produced by the generator 15 the timing device 21 is activated and produces a pulse with a controlled pulsed width $\tau$, which is controlled by a signal on the control input 23. The output of the timing device 21 is coupled to a monostable multi-vibrator 25 which supplies a pulse at the falling edge of the output of the timing device 21 which fires through a driver 27 the cut-off thyristor $T_L$. The output of the current measuring unit 5 is connected to a lowpass filter 29 and then to the input of the difference unit 9, which, through the normal state of the art, for example, can be realized by means of an operational amplifier. The signal source 11 whose output is connected to the second input of the difference unit 9, can be realized for example by a potentiometer. The output of the difference unit 9 goes to a controller R' which is also equipped in known fashion with the desired amplification and the desired frequency response. The output of the controller R' controls the pulse width $\tau$ on the timing device 21.

The current detection on the current measuring unit 5 can be realized for example with an isolation amplifier.

On the signal source 11 the rated value for the armature current is set which is compared in the difference unit 9 with the actual value of armature current. If the deviation signal is positive, i.e. the rated value is greater than the actual value, the pulse width $\tau$ will be increased on the timing unit 21, which results in a higher average armature voltage U. Conversely the pulse width $\tau$ is reduced when the deviation signal at the output of the difference unit 9 is negative.

As can be seen immediately from FIG. 4 this type of control is very suitable for regenerative braking. If on the signal source 11 the rated current value is changed in polarity—for example a negative signal is set with the source 11—the direct current machine produces a larger source voltage $U_q$ than the applied armature voltage U because with a negative deviation voltage the armature voltage is reduced.

The armature current $I_A$ changes its direction so that the measuring unit 5 produces now a negative output signal on its output 7. On the output of the difference unit 9 appears therefore the deviation $(I_A - I_{Ao})$.

By preponderant actual value $I_A$ and therefore positive deviation signal, the armature voltage U will be increased as is the case with a positive signal on the control input 3 of the voltage source 1 at driving operation. Therefore the difference between the source voltage $U_q$ and the applied armature voltage U is decreased, and the load current for the supply source $U_S$ will be reduced in this case to the given rated value. If the deviation voltage is negative the armature voltage will be reduced until again the rated load current is obtained. In the braking operation a reduction of the armature voltage causes an increase in the load or armature current, and conversely in the driving operation.

The further development of the circuit according to FIG. 5 for the braking operation is shown in FIG. 6. Due to the rectifier characteristics of the thyristor employed in the circuit, a second DC/DC pulse converter has to be provided for the braking operation, whereby of course also a single triac can be used. Generally the controlled voltage source has to provide, with a reversal in the direction of the current in its output circuit, also a reversal of the direction of the current at its input circuit, i.e. a change of the input current from feed-direction to loading or recuperating direction.

The armature circuit of the direct current machine GM is connected to the drive main thyristor $T_{Ha}$ corresponding to the main thyristor $T_H$ of FIG. 5, with the corresponding cut-off circuit 13a. The latter has again a cut-off thyristor $T_{La}$. Across the signal source for $U_s$, in series with diode $D_1$, a further by-pass diode $D_2$ is connected, across which a braking main thyristor $T_{Hb}$ with the corresponding cut-off circuit 13b within which is a cut-off thyristor $T_{Lb}$. The output of the again schematically shown difference unit 9, which may be realised as shown in FIG. 5, supplies a signal to the timing device 21 such that a positive deviation signal causes an increase in the pulse width $\tau$, and conversely. The schematically shown signal source 11 with a positive output signal, for example for the drive operation, is connected through a drive/braking switch $S_{AB}$ in the drive operation to the input of the difference unit 9. In this operation two switches $S_1$ and $S_2$ at the output of the driver circuit 19 or 27 are switched on the drive main thyristor $T_{Ha}$ and the drive cut-off thyristor $T_{La}$ respectively.

By switching of the drive/braking switch $S_{AB}$ to the braking position a negative rated load current $-I_{oB}$ is applied to the difference unit 9. The following reversal of the armature current causes a negative output signal on the current measuring unit 5. If the deviation voltage on the output of the difference unit 9 is therefore positive, according to an actual load current $-I_A$ which is too large, the pulse width $\tau$ will be increased on the timing device 21, and conversely.

With switching over of the drive/braking switch $S_{AB}$ to the braking position, the two switches $S_1$ and $S_2$ are switched to their second switching position shown in broken line fashion. In this case the longer the pulse width $\tau$ becomes, according to an actual load current $I_A$ which is too large, the higher the armature voltage U must be regulated, as mentioned. But since the main thyristor $T_{Hb}$ of the braking DC/DC converter shorts out the voltage on the armature circuit, and the corresponding cut-off thyristor $T_{Lb}$ again opens, the firing signal applied to the main thyristor $T_{Ha}$ at driving operation by the switches $S_1$ and $S_2$ is now, in the braking operation, applied to the cut-off thyristor $T_{Lb}$ and correspondingly the signal applied to the cut-off thyristor $T_{La}$ in the driving operation is now applied to the main thyristor $T_{Hb}$ i.e. in the braking operation.

Of course also in the braking operation one can, as is shown in dotted fashion, provide an adjustable signal source $11_a$ to set the respective rated load current to be hold and thereby to set the braking torque, whereby one must assure that the maximum permissible load current for the source $U_S$, $-I_{oBmax}$ is not exceeded.

In order to perform a reversal in the direction of the drive, preferably the excitation voltage $U_E$ or the excitation current $I_E$ through the excitation winding E is reversed in polarity by means of a directional switch $S_R$.

Since with increasing braking the source voltage $U_g$ decreases with the speed n, the armature voltage, which is controlled according to the rated load current, will decrease, and with no motion will reach practically zero value. In order to insure that the directional switch $S_R$ cannot be switched over during operation the armature voltage U for example is applied to a lowpass filter 31, where it is filtered and then applied to a threshold sensitive unit 33, which supplies an output signal $U_y$ when the armature voltage drops below this value a reversal of direction can be performed with the manually operated directional switch $S_R$.

With this control, which is, as previously mentioned and with the possibility of regenerative braking especially suitable for battery operated vehicles especially mine locomotives, an optimum start-up and braking behavior is obtained even at low speeds. Indeed all torque shocks will be, according to the "hard" characteristics curve of the shunt-wound motor, transmitted undamped to the signal source for $U_S$. Such a regenerative braking could be realized with a series wound motor only with considerably greater efforts and difficulty.

With the direct current machine controlled as a shunt-wound machine a desired "soft" characteristics curve can be achieved in the driving operation in an analogy to a series-wound machine when the armature current is used as the controlled signal and the excitation as the actuating signal. With the condition (1) and an armature voltage U in (2), which is now held constant, the partial derivation of the armature current according to the speed and its zero setting results in the expression $$n = \frac{o}{\Phi_o - \Delta\Phi} \qquad (10)$$

with C as the integration constant and the formula $\Phi = \Phi_o - \Delta\Phi$

The limiting condition, that the nominal speed $n_n$ should be reached at the nominal excitation $\phi_o$, results in an expression for the speed $$n = \frac{n_n \Phi_o}{\Phi_o - \Delta\Phi} \qquad (11)$$

and for the torque, with an assumed armature current $I_{Ao}$ $$M = \frac{2}{\pi} p w I_{Ao} \frac{\Phi_o n_n}{n} \quad (12)$$

The resulting speed-torque characteristic curve is qualitatively shown for different rated values of armature current $I_{AoX}$ in FIG. 7. At the rated speed $n_n$ the result is, dependent on the rated values for the current a torque $$M_x = \frac{2}{\pi} p w I_{Aox} \Phi_o \quad (13)$$

One can see from this characteristic that in fact a series-wound characteristic can be realized with the described control of a shunt-wound motor.

In FIG. 8 the block diagram of the corresponding control circuits is shown. With the rated value or reference input signal $$W = I_{Ao'},$$

the deviation signal $$W - X = (I_{Ao} - I_A),$$

the noise value $$L = \Phi_o$$

and the noise value $$Z = U/R_A$$

the resulting armature current is $$I_A = \frac{U}{R_A} - \frac{4pwn(\Phi_o - k(I_{Ao} - I_A))}{R_A} \quad (14)$$

With the amplification of the controller R $$A_r = k$$

and with the amplification in the controlled system $$A_S = 4pwn/R$$

the result is the known formula for the controlled signal $I_A$:

$$I_A = I_{Ao} \frac{A_R A_S}{1 + A_R A_S} - \Phi_o \frac{A_S}{1 + A_R A_S} + \frac{U}{R} \cdot \frac{1}{1 + A_R A_S} \quad (15)$$

In FIG. 9 the basic design of this control circuit is shown. The armature circuit of the direct current machine GM is connected to the constant armature voltage U, for instance to a battery. The armature current is measured with a current measuring unit 40 and supplied to a difference unit 42. To this difference unit 42 is connected, as rated value, an adjustable signal of a signal source 44, and the control deviation from the unit 42 controls a direct current source 48 through a control input 46 which source supplies the excitation current to the windings E of the machine.

To the controlled direct current source 48 is supplied the supply voltage $U_E$ from a source, for example from a battery. If the obtained controlled or actual signal is greater than the rated signal, the output signal of the difference unit 42 will be for example negative and the current in the excitation circuit will increase. Conversely if the actual value is smaller than the rated value the excitation flow will be reduced.

Although the direct current machine, which is so controlled, displays basically a speed-torque characteristic corresponding to a series-wound machine, regenerative braking can be carried out without trouble because the excitation and armature currents are not the series-wound machine, thanks to the actual shunt-wound connection. Regenerative braking can be realized especially at higher speeds.

If in FIG. 9 for example, a positive armature current as controlled signal is measured at an assumed driving direction and a positive rated signal is set with the signal source 44 a reversal in the polarity of the rated signal achieves that immediately a negative deviation voltage appears on the output of the difference unit 42. Therefore the excitation, for example according to equation (14) is increased so that the source voltage $U_q = 4pwn\Phi$ becomes greater than the armature voltage U.

The result is a current reversal in the armature circuit and the measured armature current becomes negative. As long as its magnitude is lower than that of the given rated or reference input signal, the excitation is further raised until the actual armature current becomes equal to the rated signal which latter therefore sets the load current for the battery or the recuperating current for the source, generally the armature voltage U. With decreasing speed the source voltage is held relatively constant, because of the dependency between excitation and speed (11), which is of course only possible up to a given maximum value for the excitation.

In FIGS. 10a and 10b a possible realisation of the direct current source 48 according to FIG. 9 is shown. The difference unit 42 according to FIG. 10b is realised with a differential amplifier to which a correspondingly polarized offset voltage-U ($\Phi_o$) is led as the setting of the nominal excitation $\Phi$.

In FIG. 11 the basic design of the current measuring unit 5 according to the FIGS. 4, 5, 6, or 40 according to the FIGS. 9 and 10 is shown. In the armature circuit a measurement resistance $R_M$ is provided. The detected voltage $U_M$ corresponding to the armature current $I_A$ is fed to a lowpass filter 52 first and then to an isolation amplifier 54 such that on its output a voltage U ($I_A$) proportional to the armature current is generated which changes its sign as the direction of the armature current changes.

As was mentioned the control of the armature current with the armature voltage as actuating signal results on one hand in an extremely favourable start-up or drive operation and regenerative braking behavior in the lower speed range. On the other hand, a further increase in speed cannot be realized. In addition, a "hard" speed/torque characteristic curve would not be desired for the driving operation, but a "soft" one according to the characteristics of a series-wound motor.

On the other hand the possibility was described to realize with shunt-wound motor a series-wound speed/-torque characteristic whereby the armature current is controlled with the excitation as actuating signal. This possibility is not suited as much for the drive operation and the regenerative braking at lower speeds but permits an operation and at the higher operating speeds and has for the continuous driving operation the desired "soft" characteristic curve of the series-wound motor.

Optimum conditions are achieved therefore, for example for the operation of battery supplied vehicles such as mine locomotives, by combining both controls alternatively. The speed/torque characteristic curves obtained thereby are shown as an example qualitatively in FIG. 12. For the start-up the armature voltage is actuated such that the armature current corresponds to the given rated signal $I_{Ao}$. This results in a start-up with a constant torque M until the nominal value $U_n$ of the armature voltage U is reached, i.e. the actuating signal is at its maximum. For example, with a drawn in characteristic load line $M_L$, the speed n and the torque M would change at a constant maximum armature voltage $U_N$ so that the characteristic would be followed from $P_1$ to $P_2$. With the still constant excitation according to illustrations in FIGS. 1–6 the armature current is thereby reduced which as already mentioned can not be maintained to its given rated value $I_{Ao}$ by a further increase in the armature voltage. If at the time in which the armature voltage U is at its maximum value the second control sets in, while from now on the armature current is held constant by actuating the excitation, a characteristic curve according to FIG. 7 will be realised for the corresponding given rated values of the armature current $I_{Ao}$, that is the motor runs to the working point $P_3$. It can be shown thereby that the tangents at the start-up, point of the armature current/excitation control are the steeper the greater the rated armature current value $I_{Ao}$ is chosen. For the regenerative braking operation departing from $P_3$ of FIG. 12, at reduced excitation $\phi_o - \Delta\Phi$, the excitation is at first increased, as was explained in FIG. 9, until the nominal excitation $\Phi_o$ is achieved for example at point $P_1$. From this moment on, for example as was explained with the aid of FIG. 6, the armature voltage U is actuated to maintain the rated load current which is set. In FIG. 13 the layout for the design of the combined control, as described already with the aid of FIG. 12 is shown, whereby the reference numbers for the armature current/armature voltage control are taken from FIG. 4 those of the armature current/excitation control from FIG. 9. Functional units which are used only once in the combined control are shown for the previously described controls with both reference numbers of the corresponding FIGS. 4 and 9. The excitation current $I_E$ is measured by means of a further current measuring unit 56, for example realised as shown in FIG. 11, and is supplied to a threshold sensitive unit 58. The threshold value sensitive unit 58 supplies an output signal $A_1$ as soon as the excitation current $I_E$ and therefore the excitation $\Phi$ has reached the nominal value $I_{Eo}$ or $\Phi_o$. The armature voltage U is also supplied to a threshold value sensitive unit 60 which supplies an output signal $A_2$ when the armature voltage U has reached its nominal value U. With the signal $A_2$ a bistable multivibrator 62 is set, with the signal $A_1$ reset. With a set bistable multivibrator 62 a control changing switch $S_w$ is closed and is again opened with the reset.

For the start-up of the machine GM, as described already with the aid of FIG. 4, the rated or reference input signal for the armature current is set with the signal source 11, and the controlled direct current voltage source 1 is actuated such that the actual armature current reaches its rated value. If the armature voltage U reaches its nominal value $U_N$, the bistable multi-vibrator 62 will be set via the threshold sensitive unit 60 and the closed switch $S_w$. From this moment on any deviation voltage appearing at the output of the difference unit 42 corresponding to unit 42 of FIG. 9, will be supplied to the control input 46 of the controlled direct current source 48 through the closed switch $S_w$. The given rated signal set on the signal source 11, 44 is now used without any further switching for the armature current/excitation control. The excitation is set such that the armature current $I_A$ follows its rated value signal $I_{Ao}$ whereby according to FIG. 12 it runs through one of the hyperbolic legs of the characteristic curves.

For initiating a braking operation as is shown in FIG. 6, the rated signal, which is supplied to the difference unit 9, 42 is reversed in polarity and the result is, according to explanations to FIG. 9 for example, a negative deviation voltage, which causes re-increase of the excitation. By maintaining the required load current set with the signal source 11, 44 the speed of the motor decreases until the excitation $\Phi$ has reached its nominal value $\Phi_o$. At this moment the armature current/excitation control will be switched back to the armature current/armature voltage control caused threshold sensitive unit 58 resetting the bistable multivibrator 62 and thus opening the switch $S_w$. According to the set rated value for the load current i.e. the reversely flowing armature current, the armature voltage U will, as already described with the aid of FIG. 4 or 6, be reduced with decreasing speed until the motor comes to a stop.

With this combined control, which is especially suitable as already mentioned for the operation of battery supplied drive units especially for vehicles such as mine locomotives, a driving behavior as with serious-wound motors is achieved, in a steady operation on one of the hyperbolic legs of the characteristic lines of the speed-torque curve, whereby start-up and regenerative braking can still be achieved to the lowest speeds. The combined control makes switching from the series-wound characteristic to a shunt-wound characteristic possible, and conversely, so that both characteristics can be utilized to the fullest for the desired operation. Through a corresponding choice and design of the excitation windings it is possible to actuate the excitation current with a transistor circuit.

In FIG. 14 a detailed circuit diagram of the layout with a combined control is shown. The functional units which correspond to those in FIG. 6 for the armature current/armature voltage control have the same reference numbers and analogously these which correspond to the layout according to FIG. 9 or 10 for the armature current/excitation control.

The armature current/armature voltage control is designed in analogy to FIG. 6 and does not have to be explained again. As a criteria for whether the armature voltage reaches its nominal value $U_N$, the signal of the pulse generator 15 and the output signal of the timing device 21 are connected with each other in an OR-gate 64. With increasing pulse width $\tau$ of the timing device 21 the average value of the output signal on the OR-gate 64 increases also, until the pulse width $\tau = T$ corresponding to the maximum value of the armature voltage, i.e. its nominal value $U_N$, whereby T corresponds to the pulse repetition period on the output of generator 15. On the output of the lowpass filter 66 a voltage U' (U) in function of the armature voltage U is produced corresponding to the average value of the output voltage of the OR-gate 64 which is supplied to a comparator $60_a$ which acts as a threshold sensitive unit. A reference voltage $U_C(U_N)$ is connected to the comparing input of the comparator so that when the armature voltage U reaches its nominal value $U_N$ an output signal is produced which, as already explained with the aid of FIG. 13, sets the bistable multivibrator 62 which closes the switch $S_w$ for the change of the control-kind. The difference unit 9, 42 is realised with a difference amplifier. The drive/braking switch $S_{AB}$ switches for the drive operation the potentiometer $P_A$ as signal source with a positive signal to the difference unit 9, 42. On the output of this unit the control deviation appears corresponding to $I_{Ao}-I_A$.

After closing of the switch $S_W$ this deviation voltage is supplied to a further difference amplifier 68 through a corresponding dimensioned controller R'', which according to the shown signs causes no signal inversion. The output voltage of the supply source for $U_E$ is connected to the difference amplifier 68 which for example corresponds to the nominal excitation $\Phi_o$. On the output of the amplifier 68 appears therefore the signal corresponding to $$U_1 \sim \Phi_o - k(I_{Ao}-I_A)$$

with k being the amplification of the controller R''.

The output voltage of the amplifier 68 is supplied, in a known way, to a bipolar current source, for example an FET-current source. According to the transfer characteristic of the current source $$I_E = -U_1/2R$$

an excitation current $I_E$ flows in the marked direction as long as the signal on the output of the amplifier 68 is positive. If the actual armature current $I_A$ is greater than $I_{Ao}$, the output signal of the amplifier 68 increases whereby the excitation current $I_E$ is increased and according to (2) or (14) the armature current is decreased. If on the other hand, the actual armature current $I_A$ is smaller than $I_{Ao}$ the output signal of the amplifier 68 is smaller and the excitation decreases.

If for the reversal of the direction in the stop mode the excitation is switched in polarity with the switch $S_R$ coupled to the switches $S_1$ and $S_2$ as already explained with the aid of FIG. 6, the voltage U ($\Phi_o$) which is supplied to the amplifier 68 and corresponds to the nominal excitation will also be reversed. Thereby the direction of the current in the armature circuit and sign of the rated value signal stay unchanged, the result is therefore $$U_1 = -\Phi_o - k(I_{Ao}-I_A)$$

If the controlled signal $I_A$ with regard to the rated value signal $I_{Ao}$ is now too large the negative output voltage of the amplifier 68 will become smaller in its magnitude and the excitation decreases. This results again in an increase of the armature current which gives the required control behavior.

It is understood that the shown functional units can be realized in many ways by those having ordinary skill in the art. As controller R'' a PI-controller should be used preferably.

For the detection of whether the machine has stopped, which is the case at a minimum pulse width on the output of the timing device 21, its output signal is supplied to a zero comparator 74 through a lowpass filter 72 which enables, as already explained with the aid of FIG. 7, the circuit for the direction reversal with the aid of the switch $S_R$, through the AND-gate 76.

A direct current voltage source which supplies a consumer circuit through a direct current pulse transformer or DC/DC pulse converter circuit, with power, has a pulsed load. This is valid, for example for the armature supply source $U_S$ according to FIG. 6 and FIG. 14 as much in the driving as in the braking operation. Now two or more consumer circuits are often connected to one and the same direct current voltage source, which work each on one DC/DC pulse converter.

In order to balance the pulsating load of the supply source to minimum, and to reduce therefore content of higher harmonics, which reduces the efforts for input filters when the supply source is a direct current voltage circuit on which as little as possible higher harmonics should appear the pulse converters which are assigned to the consumer circuits are operated with a precisely set alternate timing. The method described in the following is suited especially in combination with motors as consumer circuits as where described with the aid of FIGS. 1–14.

In FIG. 15a the pulsetrain $Z_1$ which supplies one DC/DC-pulse converter is shown with a pulse width $\tau$ at a pulse repetition period T. The pulse train $Z_2$ now shows the optimum shift for the control of a second converter fed from the same source, whereby in this case both consumer circuits are operated at the same impulse width $\tau$.

The representation B (t) shows the behavior of the source loading which varies between the load values for one receiver and for two receivers. The source is loaded more equally when the dotted line drawn in as the load, is considered by comparison, which would be encountered if both receivers were operated synchronously.

In FIG. 15b the same illustration is shown whereby the two consumer circuits are operated differently according to the pulse trains $Z_1$ and $Z_2$ and the corresponding pulse widths $\tau_1$ and $\tau_2$. A synchronous operation according to the dotted illustration results again in higher load fluctuation B (t).

The optimum phase shift between the pulse trains for two consumers results in $$\Delta\phi_{12}^{(2)} = \frac{\tau_1}{2} + \frac{T}{2} - \frac{\tau_2}{2} = \frac{\tau_1-\tau_2}{2} + \frac{T}{2}$$

which is reached then, independently of the pulse widths, when the moments at which the pulses have reached their halftime $\tau/2$ follow each other at equal timespans of T/2. This leads, if one considers the changeable pulse widths to the above expression for the phase shift $\Delta\phi$.

If three consumer circuits are used the resultant is arrived at through an analogous deduction for the optimum phase shift between a pulse train $Z_1$ for the first consumer and a pulse train $Z_2$ for the second:

$$\Delta\phi_{12}^{(3)} = \frac{\tau_1}{2} + \frac{T}{3} - \frac{\tau_2}{2} = \frac{\tau_1-\tau_2}{2} + \frac{T}{3}$$

correspondingly the resultant for the phase shift between the first and third pulse train $Z_1$ and $Z_3$:

$$\Delta\phi_{13}^{(3)} = \frac{\tau_1}{2} + \frac{2T}{3} - \frac{\tau_3}{2} = \frac{\tau_1-\tau_3}{2} + \frac{2T}{3}$$

For more than 3 consumers the optimum phase shift between a reference pulse train of a first consumer $Z_1$ and a pulse train $Z_x$ of a further consumer is given by:

$$\Delta \phi_{1x}^{(n)} = \frac{\tau_1}{2} + \frac{x}{n} T - \frac{\tau_x}{2} = \quad (16)$$

$$\frac{\tau_1 - \tau_x}{2} + \frac{x}{n} T (x = 2 \ldots n - 1)$$

whereby n determines the total number of the provided consumers.

FIG. 16 shows a block diagram of a layout for the adjustment of the optimum phase shift between two pulse trains for the control of two consumers operating on the same direct current voltage source $U_S$ with pulse converters.

The consumers 81 and 83 can be for example and as already described direct current machines with thyristor-DC/DC-pulse-converters, i.e., each with one main thyristor $T_H$ and a cut-off thyristor $T_L$ and with the corresponding circuits. Of course direct current machines as consumers 81 or 83 can be provided with driving and braking converters and the corresponding thyristors.

The DC/DC-pulse-converter of the consumer 81 is supplied through a pulse generator 85 whereby for example a monostable multivibrator 86 supplies a firing pulse to the main thyristor with each rising pulse edge of the generated pulse train.

With this switching edge of the pulse train with the frequency $f_o$ a timing unit, 87, is started and supplies a pulse with adjustable pulse width $\tau_1$. On the falling edge of the pulse supplied from the timing device 87 a firing pulse for example is given to the cut-off thyristor $T_L$ of the converter at the consumer 81 by an additional monostable multivibrator 88.

The pulse width $\tau_1$ is preferably set with the aid of a control voltage $U_{S1}$ on the control input 89 of the timing device 87. For this purpose this input is connected to an adjustable signal source 91.

The output of the generator 85 is further connected to a band pass filter, 93, with a center frequency $f_o$ which is equal to the pulse repetition frequency of the pulse train generated by the generator 85. The output signal of the band pass filter 93 is connected to a phase shifter 95 which is designed preferably as an all pass filter and is provided with a control voltage. With the control voltage $U_{S3}$ on the control input 97 the phase shift $\phi$ can be adjusted between input and output of the phase shifter 95. Such a phase shifted output signal of the phase shifter 95, is, for the recovery of a pulse train, for example connected to a Schmitt-trigger 98 whose output generates at the rising pulse edge a firing pulse to the main thyristor $T_H$ of the consumer 83, through a monostable multivibrator 100 and controls the timing device 99 assigned to this consumer. With the signal source 101 a further control voltage $U_{S2}$ set which is connected to the control input 103 of the timing device 99 and sets its output pulse width $\phi_2$. On the falling edge of the pulse produced by the timing device 99 a firing pulse is supplied through a monostable multivibrator 102 to the cut-off thyristor $T_L$ of the consumer 83.

If for the control voltage $U_{S1}$ and $U_{S2}$ are $$U_{S1} = k \cdot \tau_1$$

$$U_{S2} = k \cdot \tau_2$$

and for a constant offset voltage $U_T$ is valid:

$$U_T = k \cdot T = k \cdot 1/f_o$$

so one can see that on the output of a difference unit 105 to which the two control voltages $U_{S1}$ and $U_{S2}$ are supplied a signal appears which corresponds to the pulse width difference $\tau_1 - \tau_2$ which is enlarged on a heterodyne unit 107 by a constant value according to the pulse repetition period of the generator 85. The output of a heterodyne unit 107 is weighted on an amplifier 109 whose output signal is connected as control voltage to the control input 97 of the phase shifter 95. Thereby it is achieved that independent from the set pulse widths $\tau_1$ and $\tau_2$ an optimum loading is achieved for the supply source $U_S$. If $\tau_1$ and $\tau_2$ are equal and therefore only one control signal source is necessary for the control of both timing devices 89 and 99, a fixed voltage is applied to the control input 97 of the phase shifter 95 corresponding to the pulse repetition period of the pulse train of the generator 85. With an external voltage controlled frequency $f_o$ on the generator 85 it is understood that one uses preferably the frequency control voltage as $U_T$.

This control can also be expanded for more than two consumers whereby according to (16) weightings for the controls of the additional phase shifters have to be introduced.

The described operation with the aid of FIGS. 15 and 16, for consumers driven from DC/DC-pulse converters fed from the same direct current voltage source, is especially suited for the operation of direct current machines, such as on battery operated vehicles, for example mine locomotives which preferably have an armature current/armature voltage or combined, have an armature current/armature voltage and armature current/excitation control as already described.

What is claimed:

1. A control system for operating a shunt wound DC motor having armature and excitation circuits comprising:
    supply means;
    presetting means for selecting a desired armature current reference value signal;
    armature current measuring means coupled to said armature circuit for measuring the current in the armature circuit of said motor;
    semi-conductor armature voltage actuating means for selectively coupling said supply means to said armature circuit;
    excitation current generating means having a control input for adjustably supplying current to said excitation circuit;
    combining means for combining the output signal of said armature current measuring means with said armature current reference value signal of said presetting means for controlling at least one of the armature voltage actuating means and the excitation current actuating means;
    a first threshold level circuit for sensing the armature voltage of said armature circuit;
    a second threshold level circuit for sensing the excitation current of said excitation circuit; and
    switching means coupled to and controlled by said first and second threshold level circuits for coupling the output of said combining means to the control input of said current generating means and said armature voltage actuating means, whenever the threshold level of said first threshold sensitive means for said armature voltage is reached and for decoupling the output of said combining means only from said current generating means whenever the threshold level of said threshold sensitive means for said excitation current is reached.

2. A control system according to claim 1 wherein said presetting means includes means for generating an adjustable output signal on either side of a first fixed value, preferably of zero value, the output signal of the presetting means being continuously adjustable at least on one side of said first fixed value, and said armature current measuring means providing signals on either side of a second fixed value, preferably of zero value, according to the armature current direction.

3. A method for the operation of a direct current motor of the shunt wound type having an armature circuit including an armature winding and an excitation circuit including an excitation winding comprising the steps of:

applying an excitation current of a selected value to said excitation circuit;

selecting a desired reference armature current signal;

applying an armature voltage to said armature circuit and controlling the actual armature current resulting so that it is maintained at a value according to said reference armature current signal by adjusting the magnitude of the armature voltage applied to said armature circuit in a controlled manner, while maintaining the excitation current substantially at said selected value;

limiting the adjusted armature voltage applied to said armature circuit to a maximum predetermined value;

controlling the actual armature current resulting about the time that said adjusted armature voltage has substantially reached said maximum limit value, so that it is maintained at a value according to said reference armature current signal by adjusting the excitation current applied to said excitation circuit to a value below said selected value in a controlled manner;

monitoring the excitation current applied to said excitation circuit;

controlling the actual armature current in said armature circuit resulting about the time that the adjusted excitation current applied to said excitation circuit has increasingly substantially reached said selected value, so that it is maintained at a value according to said reference armature current signal by adjusting the armature voltage applied to said armature circuit to a value below said maximum armature voltage value in a controlled manner, while maintaining the excitation current at said selected value.

4. The method according to claim 3 whereby the reference armature current signal is chosen on one side of a fixed value for drive operation of the motor and on the other side of said fixed value for braking operation, said fixed value preferably being a zero value.

5. A method according to claim 3, whereby the excitation current is substantially maintained at said selected value when the actual armature current resulting is substantially maintained at a value according to said reference armature current signal by adjusting the armature voltage applied to said armature circuit in a controlled manner until the adjusted armature voltage has reached said maximum limit and so that the adjusted armature voltage is maintained at this maximum limit unit, until said excitation current applied to said excitation circuit has increasingly reached said selected value.

6. A control system for operating a shunt wound DC motor having an armature circuit and an excitation circuit connected to supply means comprising:

presetting means for selecting a desired armature current reference value signal;

armature current measuring means coupled to said armature circuit for measuring the current in the armature circuit of said motor;

armature voltage actuating means having a control input for adjustably supplying armature voltage from said supply means to said armature circuit;

excitation current generating means having a control input for adjustably supplying current from said supply means to said excitation circuit;

means for combining the output of said armature current measuring means and said armature current reference value signal of said presetting means for controlling at least one of the armature voltage actuating means and the excitation current generating means;

a first threshold level circuit for sensing the armature voltage supplied to said armature circuit;

a second threshold level circuit for sensing the excitation current supplied to said excitation circuit; and switching means coupled to said first and second threshold level circuit, said switching means being set by said first threshold level circuit for coupling the output of said combining means to the control input of said current generating means, so as to adjustably supply current to said excitation circuit to have the current in the armature circuit maintained on a value according to said armature current reference value signal, and said switching means being reset by said second threshold level circuit for coupling the output of said combining means to the control input of said armature voltage actuating means to adjustably supply armature voltage to said armature circuit to maintain the current in the armature circuit on a value according to said armature current reference value signal.

7. A control system according to claim 6, wherein said armature voltage actuating means supplies armature voltage from said supply means to said armature circuit up to a maximum limit value, said maximum limit value being the same as the value of the threshold level of said first threshold level circuit.

8. A control system according to claim 6, in which the excitation current generating means supplies current to said excitation circuit up to a predetermined maximum limit value, which predetermined maximum limit value is substantially equal to the value of the threshold level of said second threshold level circuit.

9. A control system according to claim 6, wherein said armature voltage actuating means comprises a thyristor switching DC-to-DC converter.

10. A control system according to claim 6, wherein said armature voltage actuating means provide for reversal of current direction of the input current delivered from or to said supply means in response to reversal of current direction of the output current delivered to or from said armature circuit.

11. A control system according to claim 10, said armature voltage actuating means comprising two switching DC-to-DC converters, one for each direction of output current.

12. A control system according to claim 6, wherein said presetting means includes means for generating an adjustable output signal on either side of a first fixed value, preferably of zero value, the output signal of the presetting means being continuously adjustable at least on one side of said first fixed value and said armature current measuring means providing signals on either side of a second fixed value, preferably of zero value, according to the current direction within said armature circuit.

13. A control system according to claim 6, wherein the excitation current generating means includes means for selectively supplying current in both current directions to said excitation circuit.

14. A control system according to claim 6, wherein the excitation current generating means comprises a controllable transistor current source.

15. A control system according to claim 6, wherein the excitation current generating means comprises a controllable FET-current source.

16. A control system according to claim 14, wherein said current source includes means controllable to supply current in both directions to said excitation circuit.

17. A control system according to claim 6, wherein said current source includes means controllable to supply current in both directions to said excitation circuit.

18. A control system according to claim 6, wherein said excitation circuit further comprises current limiting means for limiting the current supplied to said excitation circuit to a minimum value to prevent overspeeding of said d.c. motor.

19. A control system according to claim 18, wherein said limiting means comprises a control input to adjust the value of said minimum value.

* * * * *

UNITED STATES PATENT AND TRADEMARK OFFICE
CERTIFICATE OF CORRECTION

PATENT NO. : 4,506,200

DATED : March 19, 1985

INVENTOR(S) : Walter Datwyler and Leo Meister

It is certified that error appears in the above-identified patent and that said Letters Patent is hereby corrected as shown below:

Column 2, line 61 "mtor" and insert --motor--.
Column 4, equation 2 change "4pn" at both instances to --4pw--.
Column 8, equation 10 delete "0/$\Phi_0 - \Delta \Phi$" and insert --C/$\Phi_0 - \Delta \Phi$--.
Column 8, line 61 delete "$\phi_0$" and insert --$\Phi_0$--.
Column 11, line 11 change "drawn in" to --drawn-in--.
Column 11, line 31 change "$\phi_0$" to --$\Phi_0$--.
Column 12, line 20 after "caused" insert the word --by--.
Column 15, line 57 delete "$\phi_2$" and insert --$U_2$--.

*Signed and Sealed this*

*Third* Day of *September 1985*

[SEAL]

*Attest:*

DONALD J. QUIGG

*Attesting Officer*    *Acting Commissioner of Patents and Trademarks - Designate*